(12) United States Patent
Latarnik et al.

(10) Patent No.: US 6,330,496 B1
(45) Date of Patent: Dec. 11, 2001

(54) METHOD FOR ADJUSTING THE DRIVING PERFORMANCE OF A MOTOR VEHICLE USING TIRE SENSORS

(75) Inventors: Michael Latarnik, Friedrichsdorf; Helmut Fennel, Bad Soden, both of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/202,858

(22) PCT Filed: Jun. 17, 1997

(86) PCT No.: PCT/EP97/03139

§ 371 Date: May 21, 1999

§ 102(e) Date: May 21, 1999

(87) PCT Pub. No.: WO97/49586

PCT Pub. Date: Dec. 31, 1997

(30) Foreign Application Priority Data

Jun. 21, 1996 (DE) .............................. 196 24 795

(51) Int. Cl.⁷ ........................................ G06F 7/00
(52) U.S. Cl. .................. 701/1; 701/70; 303/146; 303/198; 73/178 R
(58) Field of Search .................. 701/1, 36, 70, 701/72, 41; 303/100, 111, 121, 146, 140, 160, 139; 180/246, 247, 248

(56) References Cited

U.S. PATENT DOCUMENTS

| | | | |
|---|---|---|---|
| 5,025,879 | * | 6/1991 | Mitsunari ................. 180/79 |
| 5,228,757 | * | 7/1993 | Ito et al. .................. 303/100 |
| 5,267,783 | * | 12/1993 | Inoue et al. ............... 303/111 |
| 5,303,989 | * | 4/1994 | Yasuno et al. ............. 303/111 |

(List continued on next page.)

FOREIGN PATENT DOCUMENTS

| | | |
|---|---|---|
| 833005 | 1/1952 | (DE) . |
| 840957 | 4/1952 | (DE) . |
| 3308080 | 9/1984 | (DE) . |

(List continued on next page.)

OTHER PUBLICATIONS

Search Report of the German Patent Office for Application 196 24 795.0.
Japanese Abstract 61125498, published Dec. 8, 1987.
Japanese Abstract 06245389, published Apr. 30, 1996.
Japanese Abstract 03240600, published Mar. 2, 1993.
Japanese Abstract 03078493, published Oct. 13, 1992.
Japanese Abstract 06259129, published Apr. 16, 1996.
Japanese Abstract 02181095, published Mar. 6, 1992.
Japanese Abstract 02034542, published Oct. 25, 1991.

*Primary Examiner*—Jacques H. Louis-Jacques
(74) *Attorney, Agent, or Firm*—Rader, Fishman & Grauer PLLC

(57) ABSTRACT

Taking into account the signals of tire sensors to adjust the driving performance of a vehicle is known. For example, the signals of contact sensors can be used to indicate the forces which act on the individual vehicle tires. According to this new method, to permit a control intervention in the shortest possible real time, especially those forces are used as a control quantity which are determined by the signals from tire sensors. This means that nominal conditions of the vehicle are converted into nominal forces $F_{i,Soll}$ which are compared to the actually applied forces $F_{i,Ist}$. The so produced differences in forces $\Delta F_i$ are then converted by a wheel force controller (2), for example, into brake pressure variations or variations of the engine drive torque which then influence the vehicle (3) as a controlled system. Because the forces ($F_{i,Ist}$) which act on the vehicle tires are quantities describing the driving condition of the vehicle which can be determined most quickly, the reaction time of the system is extremely short, and therefore driving performance can be better controlled.

8 Claims, 1 Drawing Sheet

U.S. PATENT DOCUMENTS

| | | | | |
|---|---|---|---|---|
| 5,620,239 | * | 4/1997 | Mihara et al. | 303/121 |
| 5,772,289 | * | 6/1998 | Nakazawa et al. | 303/9.69 |
| 5,857,754 | * | 1/1999 | Fukami et al. | 303/146 |
| 5,864,056 | * | 1/1999 | Bell et al. | 74/146 |
| 6,009,968 | * | 1/2000 | Kouno | 180/248 |
| 6,070,952 | * | 6/2000 | Tozu et al. | 303/146 |

FOREIGN PATENT DOCUMENTS

| | | |
|---|---|---|
| 3915879 | 11/1990 | (DE) . |
| 3935588 | 4/1991 | (DE) . |
| 4128639 | 3/1993 | (DE) . |
| 4321571 | 1/1994 | (DE) . |
| 4435160 | 4/1996 | (DE) . |
| 325298 | 7/1989 | (EP) . |
| 0444109 | 9/1991 | (EP) . |
| 465958 | 1/1992 | (EP) . |
| 476372 | 3/1992 | (EP) . |

* cited by examiner

METHOD FOR ADJUSTING THE DRIVING PERFORMANCE OF A MOTOR VEHICLE USING TIRE SENSORS

FIELD OF THE INVENTION

The present invention relates to a method of controlling the driving performance of a vehicle, using tire sensors to determine forces that act on the individual vehicle wheels.

BACKGROUND OF THE INVENTION

A method of this type is disclosed in EP Patent No. 0 444 109 B1, for example. This publication describes a method and a device for determining tire prints, for the conversion thereof into forces which act on the tires and for improvement of the driving performance of the vehicle. Beside tire sensors which sense the tire contact, there are provided still other sensors, such as sensors for sensing the wheel circumferential speeds, the steering angle of the wheels, the position of the wheel suspensions and the center-of-gravity acceleration. The control method discloses sensing the forces and torques which act on the respective tire by way of tire print sensors. The forces and torques found are used, along with the other sensor means, to control the movement of the automotive vehicle. The above publication does not disclose which physical quantity is the actual control quantity used by the method.

It is state of the art, for example, to perform yaw torque control where a nominal yaw rate is compared with an actual yaw rate and, in the event of a discrepancy of the actual yaw rate from the nominal yaw rate, this difference is converted into control signals for defined correction elements. Operation of the correction elements will then cause the actual yaw rate to approach the nominal yaw rate. When, according to the above-mentioned publication, a defined physical quantity such as the rotational speed of the wheels shall be controlled selectively, it is assumed that this speed is also the control quantity. Initially, the forces which act on the wheels must be processed to calculate a nominal speed of the wheels. Matters are similar with respect to the steering angle or the position of the wheel suspensions of the wheels. The signals of the tire contact sensors are each time converted into the physical quantity respectively being controlled in order to compare an actual vehicle performance with a nominal vehicle performance. This necessitates a major expenditure in calculations because the physical quantity underlying the control cannot be determined directly, but only in a complicated fashion by converting tire contact signals into tire forces and torques and by further processing them into the physical quantity. Such a complicated processing of signals necessitates a considerable length of real time, thereby entailing a long reaction time until control intervention. The actual physical quantities which result at the end of such a complicated calculation are no longer relevant at the time they are calculated: The control quantity of the method will suffer because the control intervention which is performed with delay only may possibly not satisfy the demands of the actual driving situation.

Therefore, an object of the present invention is to provide a method of controlling the driving performance of a vehicle, utilizing tire sensors, which method permits a quickest possible reaction to a critical driving performance by way of a controlling intervention.

SUMMARY OF THE INVENTION

This object is achieved by making the forces acting on the tires the control quantity of a control circuit. The principle of the present invention is based on the following reflection: The tire sensors permit the simple calculation of forces and torques in longitudinal, transverse and vertical directions. Thus, calculation of these forces and torques requires only little time. It is therefore advisable to take especially these forces into account as a control quantity of the driving performance in order to perform a control intervention in a most direct manner.

Of course, there may be still other physical quantities which are taken into account in the calculation of the nominal performance of the vehicles. The preset nominal value always determines in first line the direction in which the control quantity is adjusted. Therefore, the preset nominal value can pass a greater loop of calculating operations and need not always be as absolutely current as is advisable for the actual value of the driving performance. The direction in which the control quantity is adjusted, as time goes by, will not vary so greatly as the actual quantity that is characteristic of the driving conditions.

Nominal forces in a longitudinal direction or also transverse direction, such as during cornering, which are determined by way of the method of the present invention may be converted into brake pressure variations or absolute brake pressures, for example. In hydraulic brake systems, they may also be converted into valve actuation periods, or current intensities when proportional valves are used. It is also possible to vary the engine drive torque to control driven wheels with respect to nominal forces. In this arrangement, however, the forces which act on the tires always remain the control quantity which dictates the intervention into the wheel brakes or the engine drive torque.

To determine nominal forces, the actual forces can be processed along with other input quantities. For the reasons mentioned hereinabove, it is of no significance with respect to the control quality that this calculating operation requires a longer real time.

Thus, a control method according to the present invention for yaw torque control would be such that a nominal yaw torque is calculated under certain circumstances, however, no actual yaw torque is sensed by a yaw rate sensor. On the contrary, a nominal yaw torque is converted into nominal forces which would have to act on the respective vehicle tire if the nominal yaw torque were coincident with the actual yaw torque. The actual forces which act on the vehicle tire will then be controlled to approach the nominal forces.

In an electronic brake force distribution, for example, the actual forces on the front wheels can be taken into account for determining the nominal forces for the respective rear wheels.

Further input quantities which are taken into account for the determination of the nominal quantities could be individual wheel speeds and a vehicle reference speed, for example. These input quantities could typically be sensed by way of wheel sensors or by a corresponding configuration of the tire sensors.

The present invention will now be explained in detail by describing two embodiments in two Figures.

DETAILED DESCRIPTION OF THE DRAWINGS

Figure 1:
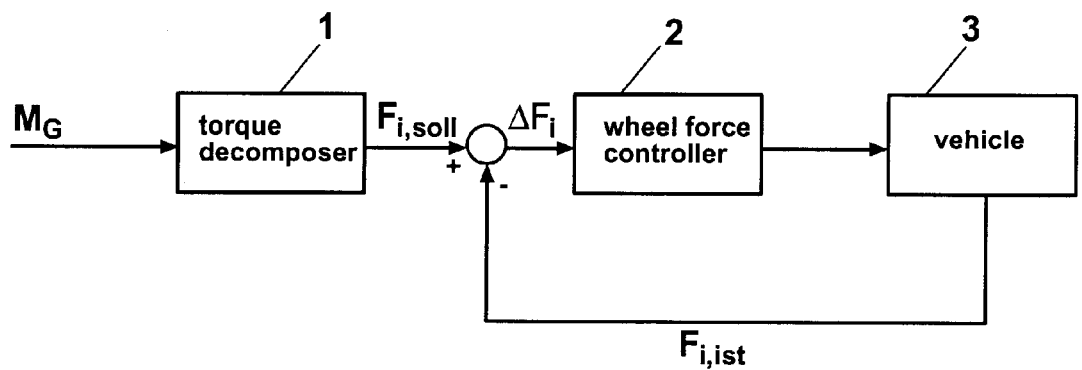
FIG. 1 is a view showing an embodiment of the present invention which is used for yaw torque control.

In the FIG. 1 embodiment, a torque decomposer is furnished with a nominal yaw torque $M_G$ which is determined in a way not shown. The torque decomposer 1 determines from the nominal yaw torque $M_G$ forces $F_{i,soll}$ which must be generated by the individual vehicle tires to achieve the nominal yaw torque $M_G$ indicated. From this, along with the actually generated forces $F_{i,ist}$, result differences in forces $\Delta F_i$ which are supplied to a wheel force controller 2. The wheel force controller will now calculate actions, based on the differences of forces to be adjusted, which must be carried out on the individual vehicle wheels.

In a hydraulic brake system, matters could be so that differences in pressure, absolute pressures, valve actuation times or also current intensities for proportional valves are determined. A variation of the drive torque can be calculated from the differences in forces for driven wheels. The so calculated actions are performed on the vehicle 3 and have new, updated actual forces $F_{i,ist}$ as a result.

A nominal yaw torque to be introduced into the control circuit according to FIG. 1 can be calculated in a conventional manner by way of customary sensor means, for example, by way of a steering angle sensor and a defined vehicle reference speed.

However, it is also possible to take into account the individual forces $F_{i,ist}$ on the tire measured by tire sensors, in order to determine the nominal yaw torque $M_G$.

It is essential that the sensor signals $F_{i,ist}$ are converted directly in the wheel force controller 2 into actions to be taken on the vehicle 3. The result is a shortest possible time of calculation for intervention into the vehicle and, thus, an improved driving performance due to the shortened reaction time in this control circuit. The calculation of the nominal yaw torque $M_G$ may take a longer period of time because a nominal value specification dictates in first line the direction of the control. The illustration of the actual driving condition must be much more current. This is realized by the present invention in an ideal way.

Figure 2:
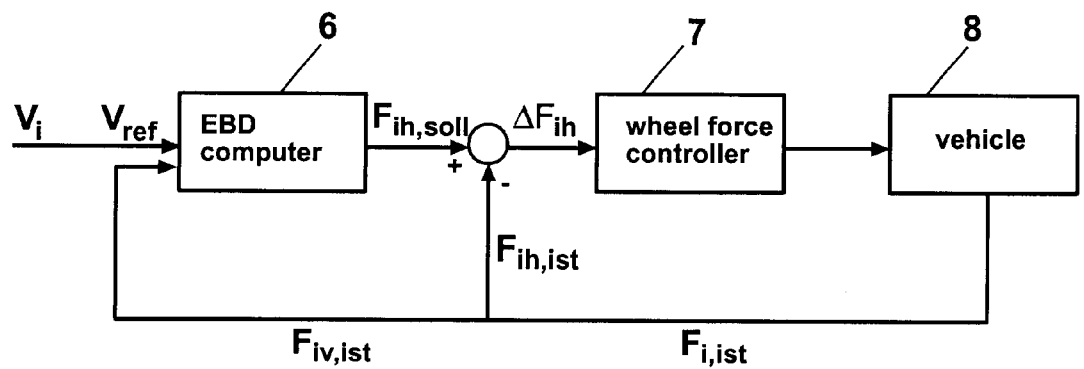
FIG. 2 is a view showing a possibility of applying the present invention for electronic brake force distribution.

FIG. 2 shows the possibility of performing electronic brake force distribution on the vehicle by way of the present invention. The purpose of electronic brake force distribution is to prevent that the rear wheels lock before the front wheels during pedal-operated braking by way of electronic brake pressure control on the rear-axle brakes.

Apart from the actual forces $F_{iv,ist}$ which act on the front wheels, still other input quantities are introduced into the computer, herein termed as EBD computer 6 in short, for determining nominal forces $F_{ih,soll}$ to be applied to the rear-axle brakes. The input quantities herein include individual wheel speeds $v_i$ and the vehicle reference speed $v_{ref}$. Instead of these signals, other signals may be used, such as a steering angle signal, a transverse acceleration signal, or similar signals indicative of cornering. Besides, these data about the additional input quantities can originate from tire sensors which have an appropriate configuration.

Thus, the EBD computer 6 determines forces which shall be generated by the rear wheels. The forces are related to the actual forces $F_{ih,ist}$ which indeed act already on the tires of the rear wheels. The so determined differences in forces on the rear wheels $\Delta F_{ih}$ which are to be adjusted are passed on to the wheel force controller 7 which, similar to the wheel force controller 2, calculates measures which must be taken to adjust the differences in forces $\Delta F_{ih}$. However, the wheel force controller 7, for the purpose of electronic brake force distribution, calculates only actions to be taken on the rear wheels of the vehicle 8. After these actions have been taken, new force ratios will result on the individual vehicle tires $F_{ih,ist}$. These force ratios are taken into account for the further control.

It applies in this case, too, that the control quantity for adjusting an optimal electronic brake force distribution is always the amount of forces that act on the rear wheels. The forces $F_{i,ist}$ characteristic of the actual condition of the vehicle can be processed directly. Only the nominal value determination undergoes a greater loop which is not critical, however, for the reasons mentioned hereinabove.

Thus, a so-called cascade controller which permits a very quick intervention into the current driving condition of the vehicle can be realized by the present invention.

What is claimed is:

1. Method of controlling the driving performance of a vehicle with a closed loop control circuit comprising the steps of:

using tire sensors to determine forces which act on front and rear tires;

utilizing the forces which act on the tires as a control variable of a closed loop control circuit;

producing a difference between nominal forces and actual forces which act on the tires; and adjusting the control variable using the closed loop control circuit based on the difference between the nominal forces and the actual forces which act on the tires, wherein the closed loop control circuit converts actual forces together with other input quantities that are characteristic of a current driving situation into nominal forces, wherein the actual forces on the front tires are used for determining the nominal forces on the rear tires.

2. Method as claimed in claim 1, wherein the control variable is brake pressure.

3. Method as claimed in claim 1, wherein the control variable is a valve actuation time of a hydraulic brake.

4. Method as claimed in claim 1, wherein the control variable is an intensity for driving a proportional valve.

5. Method as claimed in claim 1, wherein the control variable is an engine drive torque.

6. Method as claimed in claim 1, wherein the other input quantities include one of individual wheel circumferential speeds and a vehicle reference speed.

7. Method as claimed in claim 6, wherein the other input quantities are derived from tire sensor signals.

8. Method as claimed in claim 1, wherein the nominal forces which act on the tires comprises a yaw torque.

\* \* \* \* \*